US008935666B2

(12) United States Patent
Miller, III

(10) Patent No.: US 8,935,666 B2
(45) Date of Patent: Jan. 13, 2015

(54) SYSTEMS AND METHODS FOR DYNAMIC MOBILE APPLICATIONS

(76) Inventor: Gordon G. Miller, III, Glen Allen, VA (US)

( * ) Notice: Subject to any disclaimer, the term of this patent is extended or adjusted under 35 U.S.C. 154(b) by 471 days.

(21) Appl. No.: 13/174,125

(22) Filed: Jun. 30, 2011

(65) Prior Publication Data

US 2012/0066673 A1    Mar. 15, 2012

Related U.S. Application Data

(60) Provisional application No. 61/360,266, filed on Jun. 30, 2010.

(51) Int. Cl.
*G06F 9/44* (2006.01)
*G06F 9/445* (2006.01)

(52) U.S. Cl.
CPC .......................................... *G06F 8/71* (2013.01)
USPC ............ 717/121; 717/100; 717/174; 717/178

(58) Field of Classification Search
None
See application file for complete search history.

(56) References Cited

U.S. PATENT DOCUMENTS

| 7,958,494 | B2 * | 6/2011 | Chaar et al. | 717/121 |
| 8,365,146 | B2 * | 1/2013 | Tysowski et al. | 717/121 |
| 8,782,603 | B2 * | 7/2014 | Plate | 717/121 |
| 2005/0257210 | A1 * | 11/2005 | Stienhans et al. | 717/170 |
| 2007/0240154 | A1 * | 10/2007 | Gerzymisch et al. | 717/174 |
| 2009/0100402 | A1 * | 4/2009 | Heuler et al. | 717/100 |
| 2010/0050169 | A1 * | 2/2010 | Dehaan | 717/178 |
| 2012/0159438 | A1 * | 6/2012 | Plate | 717/121 |

OTHER PUBLICATIONS

Natchetoi et al., Service-oriented architecture for mobile applications, May 2008, 6 pages.*
Marco de Sa et al., Lessons from early stages design of mobile applications, Sep. 2008, 10 pages.*
Nichols et al., Highlight: a system for creating and deploying mobile web applications, Oct. 2008, 10 pages.*

* cited by examiner

*Primary Examiner* — Thuy Dao
(74) *Attorney, Agent, or Firm* — Troutman Sanders LLP; James E. Schutz; Jay R. Anderson

(57) ABSTRACT

Various embodiments of the present invention are dynamic, cross-platform application architectures for devices. According to an exemplary embodiment of the present invention, a platform-specific thin client can be provided on a mobile device. The thin client can be a simple code base customized for the device platform and prepared to configure itself to become a desired application. The thin client can be directed at a trusted source, which can initiate the configuration by delivering data instructing the thin client as to how it should behave under the current conditions and by delivering a framework for the GUI of the application. After the thin client is configured, the thin client can receive content for providing an application to a user. Thus, only a simple code base need be provided on for a device, and that code base can be dynamically configured to perform a desired task under given conditions.

18 Claims, 12 Drawing Sheets

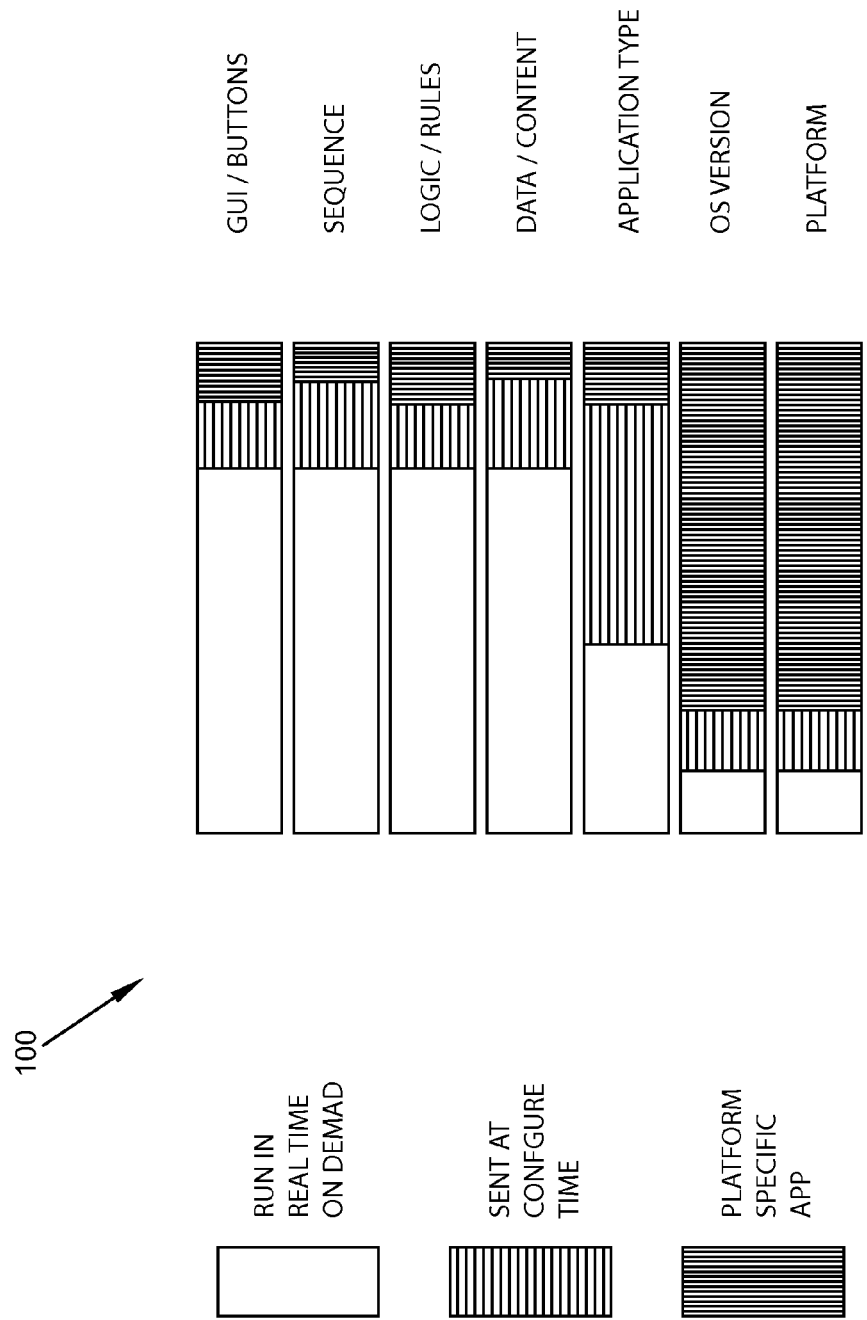

| | OS Platform | Native API | .NET | Java | Silverlight | Qt | HTML/Javascript | Adobe Flash | SqLite |
|---|---|---|---|---|---|---|---|---|---|
| Windows CE/Mobile | Windows CE | yes eVC (C++) | yes (CF .NET 3.5) | yes ME | announced | yes | yes IE Mobile | yes | yes extra deployment needed |
| Blackberry | Blackberry | yes | no | yes ME | no | no | yes | no | yes from Device Software 5.0 |
| Android | Linux | yes C, C++ (limited functionality) | no | yes Dalvik VM | no | no | yes WebKit | announced HTC Hero | yes |
| Symbian | Psion EPOC descendant | yes Symbian C++ | no | yes ME | announced | yes | yes WebKit | yes | yes Q3 2007 devices |
| iPhone | Mac OS X derived!? | yes Objective-C | yes MonoTouch | no | no | no | yes WebKit | no | yes |
| Palm webOS | Linux | no | no | no | no | no | yes WebKit | announced | yes |
| Maemo | Linux | yes C,C++,Python | yes Mono | unofficially | yes Moonlight | yes | yes Mozilla | yes | yes |

Fig. 2

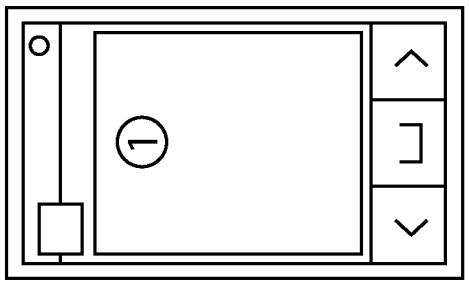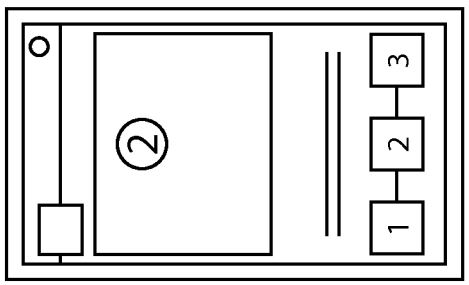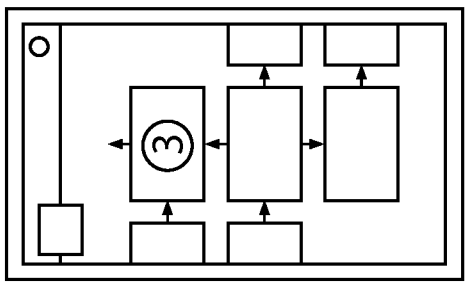
Fig. 3B

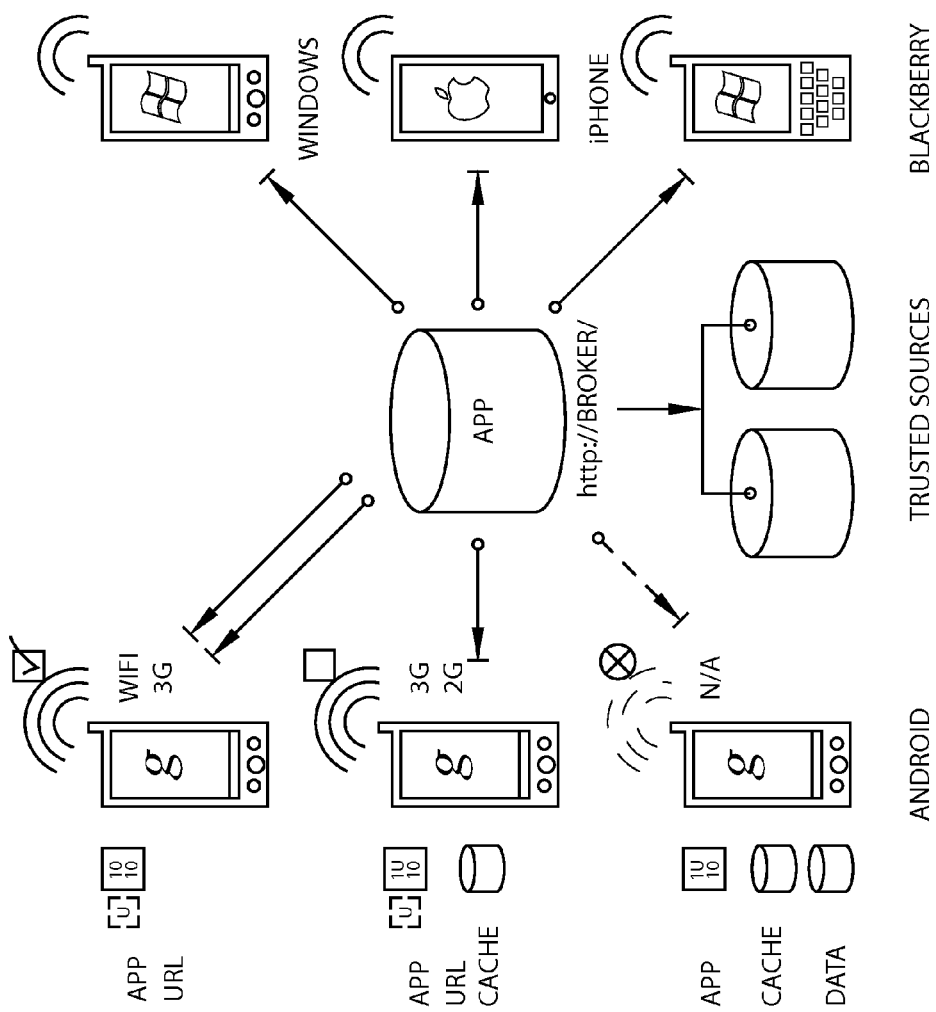

SYSTEMS AND METHODS FOR DYNAMIC MOBILE APPLICATIONS

CROSS-REFERENCE TO RELATED APPLICATIONS

This application claims a benefit, under 35 U.S.C. §119(e), of U.S. Provisional Application Ser. No. 61/360,266, filed 30 Jun. 2010, the entire contents and substance of which are hereby incorporated by reference as if fully set forth below.

TECHNICAL FIELD

Various embodiments of the present invention relate to mobile applications and, more particularly, to systems and methods for providing dynamic mobile applications through a cross-platform mobile architecture.

BACKGROUND

As the popularity of mobile devices, particularly smartphones, has increased, electronics companies have responded by introducing an array of differing platforms for mobile devices. To meet the needs of end users utilizing differing mobile platforms, application developers are challenged to provide mobile applications that can run on numerous platforms. Meeting this challenge is generally a burden, as it requires developing completely different applications for different platforms, each application performing essentially the same functions but built atop widely diverging specifications.

Further, the conditions in which an application runs on a particular mobile platform can vary. For example, in some instances a mobile device may be connected to a network, while in other instances, no network may be available. If application developers hope to achieve the most robust performance of their applications, they must either provide different applications for different conditions on each mobile platform, or they must carefully code their applications to behave differently under different circumstances.

As a result, to produce a robust mobile applications, a developer can either provide numerous versions of an application, each customized for a particular platform running under particular conditions, or the developer consolidate potential versions into unwieldy code that requires complex installation and is difficult to update as technology and preferences evolve.

SUMMARY

There is a need for an application system and architecture that can be efficiently ported to various mobile platforms and dynamically configured to run desired tasks under current, detected conditions. It is to such an application architecture that various embodiments of the present invention are directed.

Briefly described, exemplary embodiments of the present invention can be application systems and architectures for mobile applications. For example, an exemplary application system can comprise a thin client. The thin client can be platform-specific, so that a first type of thin-client on, for example, an Android device can differ from a thin-client on, for example, a Windows Mobile device. The functionality of the thin client can be the same or similar regardless of the platform.

The thin client can be configurable for a specific purpose, for example, to behave as a specific application. In some embodiments, a user of a mobile device can configure the thin client as desired, and in some other embodiments, the thin client can be automatically configured when accessing a trusted source. The thin client can be reconfigurable each time a new application is needed, or each time a trusted source is accessed.

After configuration, the thin client can receive additional content for performing the task or tasks corresponding to the configuration of the thin client. The received content can vary based on various circumstances determined during configuration, for example, whether the mobile device is connected to a network and what task the thin client is configured to perform.

Thus, according to an exemplary embodiment of the present invention, a simple code base in the thin client can be dynamically configured into one or a plurality of applications, thus providing better long term code maintenance and reducing lifecycle costs. A user of a mobile device can efficiently access a new application and new data simply by pointing the mobile device to a new trusted source, thus reducing overall deployment time for new applications and saving the system's administration and support time. Additionally, content can be optimized for different modes of use without having to download different applications or content, a benefit that is not achieved by conventional precompiled applications.

These and other objects, features, and advantages of the application system will become more apparent upon reading the following specification in conjunction with the accompanying drawing figures.

BRIEF DESCRIPTION OF THE FIGURES

FIG. 1 illustrates various layers of an application architecture, according to an exemplary embodiment of the present invention.

FIG. 2 is a table illustrating a cross-platform compatibility cross-walk matrix for some supportable devices of the application system, according to an exemplary embodiment of the present invention.

FIGS. 3A-3B are diagrams illustrating various configurations options of the application system, according to an exemplary embodiment of the present invention.

FIG. 4 illustrates behaviors of an application running in differing modes, according to an exemplary embodiment of the present invention.

DETAILED DESCRIPTION

Figure 3A:
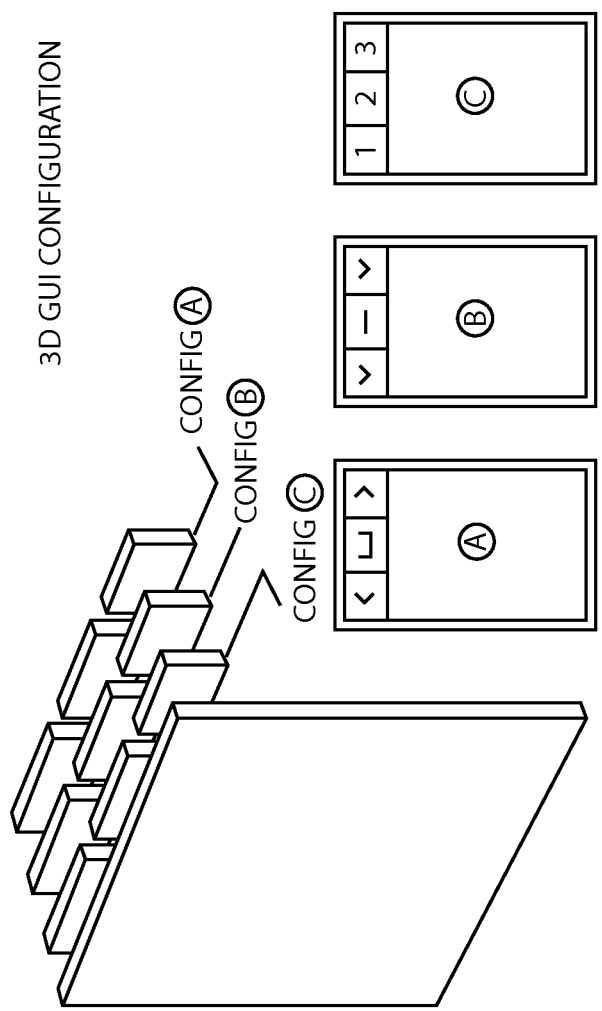

To facilitate an understanding of the principles and features of the invention, various illustrative embodiments are explained below. In particular, the invention is described in the context of being an application architecture, and systems and methods for providing same, for mobile smartphones configured to operate on various platforms in various operating modes. Embodiments of the invention, however, are not limited to these embodiments. Rather, various aspects of the present invention can be application architectures for other devices as well, such as for example, netbooks or notebook computers.

The materials and components described hereinafter as making up elements of the invention are intended to be illustrative and not restrictive. Many suitable materials and components that would perform the same or similar functions as the materials and components described herein are intended to be embraced within the scope of the invention. Other materials and components not described herein can include, but are not limited to, for example, similar or analogous materials or components developed after development of the invention.

The recent popularity of the Apple iPhone has given credibility to the long held belief of the value of mobile solutions, but with that popularity has also come a diverse series of challenges for organizations seeking to deliver applications and content to a wider range of devices, including for example, Android devices, Blackberry, Palm, and Windows Mobile devices, as well as the iPhone.

An exemplary embodiment of the present invention can be a cross-platform application system providing a mobile architecture, which can address the above issues of how to deliver applications, data, training and other content to multiple devices, while also offering additional flexibility in configuring applications rather than pre-installing them.

A. INTRODUCING A CONTAINER ARCHITECTURE

An exemplary architecture of the present invention can begin with an application running on a local device, such as a smartphone device. In an exemplary embodiment, the application need not be preconfigured for a specific function or purpose. Rather, the application can be a "container" that that can be filled up or "configured" to make the type of application that is needed at a given time.

FIG. 1 illustrates an exemplary layer diagram of the application system 100, according to an exemplary embodiment of the mobile architecture design. As shown in FIG. 1, once the application is configured, "content" in the form of GUI elements that populate the application structure can be transmitted. The content can be sent in the form of text, graphics, animations, audio, and video that make up the content accessible by the user through the application as configured. The application can comprise structure and logic to support various connected and disconnected mode strategies, as well as "mode" states, which allow content sequencing to change based on conditions like an emergency. For example, in an emergency mode state, a single screen of CPR instructions to save someone's life can be delivered, as opposed to an hour-long course of first aid, which can be delivered in an alternative mode state.

An exemplary architecture can start with a very small, generic, container application that can be platform specific. The function of this application can be identical on every platform, but how it performs the function can be specific to the device or platform and dependent on compiled code for that platform. The container application can provide a dynamic application framework to be configured for a specific purpose. In some embodiments, the container can have the smallest cross section of functionality required to function on that device.

FIG. 2 is a table illustrating a cross-platform compatibility cross-walk matrix for some exemplary devices supportable by embodiments of the present invention. The wide variety of mobile platforms and the considerable variation in supported technologies on each platform made this task a challenge to be sure. Some exemplary devices supported by embodiments of the present invention can include Android, iPhone, and Windows Mobile devices, which make up a significant portion of the U.S. mobile device market. Embodiments of the present invention can also support other platforms, such as Blackberry or Palm.

B. CONFIGURING THE THIN CLIENT FOR SPECIFIC APPLICATION OR FUNCTION

With the container application running on a device, a user can configure the container application to access one or multiple trusted sources. A trusted source can ask the container application what type of application it wants to be or, the trusted source can automatically configure the container application based on predetermined characteristics of the trusted source. In some embodiments, when the container application determines its own application type, it can do so by receiving a request from the user for a specific application. Accordingly, the user can customize the container application. The application system can provide a local data store controlled by the session, whereby the application system can write information to a local location of the container application. At the termination of each session, the application system can retain or remove information in the local data store, as instructed based on the specifics of various settings or security implementation.

For example, a first trusted source can exist for a predetermined purpose, such as to provide trainings, and can always configure a container application for that purpose. In this way, a single container application can be used to log into multiple trusted sources and can thus configure itself to perform different tasks each time. In some embodiments, separate individual instances of a given container can be directed each to a different source, which can then configure each instance of the application as needed or intended to give the user the impression of multiple applications.

Configuration data for the container application can contain information for the size, location, and orientation for navigation and information objects, which are later populated by the content. The configuration data can also provide instructions for state, function, and linkages between features and functions. For example, and not limitation, the configuration data can determine what features or functions are activated by selecting a button, or other object, such as switching to another screen or performing some other action.

After the container application is configured for a specific type of application, the user, the system, or the conditions under which the application is used can configure the way in which information is delivered and navigated. FIG. 3A is a diagram illustrating how the container application can be configured based on platform, and FIG. 3B is a diagram illustrating exemplary configuration option based on navigation or usage. For example, if a user is casually browsing information, then a simple sequential configuration can be used. If a user tries to perform a series of specific steps quickly to get a task done, then, for example, an optimized mode can be used. If a user navigates a complex branching or decision tree associated with the task, then, for example, an appropriate complex navigation tree can be provided. These application-specific and then function-specific configurations can be pushed to the device in such as way as to inform the application container what type of application the application must configure and what content is expected.

C. POPULATING THE GUI AND CONTENT

As discussed above, the container application can become a platform-specific mobile application logged into a trusted source, aware of what type of application it is, and further aware of what type of content is to expected based on the modality of use.

After configuration, the applicable content data can be delivered to the application. The content data can be provided to the container application from a trusted source having a content repository. This trusted such may, but need not, be the same trusted source that provided the configuration data. The user interface items and the information items can be populated by the text, images and media from a content repository. Until the content is accessed and loaded into the container application, the overall look and feel of the user interface and nature of the content is may not be fully realized.

While a graphical user interface (GUI) framework can be delivered to the application during the previous configuration step, the GUI contents can be loaded after configuration, as part of the content data. The contents may include one or more of the following, for example: text, graphics, animation, audio and video, business rules, logic, and information about the platform itself. In some embodiments, the delivered content may be controlled by various features of the mobile device receiving the content, such as a connection mode, connection speed, usage patterns, environment, security level, or other conditions. For example, to deliver a training application when Wi-Fi/4G is present, a video can be provided, but if only 3G/2G speed is available, then pictures and text can be used instead. The dynamic configuration of content can allow for the content to be removed or revealed in the event that a user becomes disconnected. This can protect sensitive or classified information from falling into the wrong hands, while still enabling the user able to rely on whatever nominal information is delivered in a given mode.

One of the unique features of various embodiments of the present invention is that the same configuration may be populated by different content, which may result in a similar functioning interface but a different overall look and feel and a different manifestation, sequence, and instance of the information content items.

The benefit to this exemplary approach is three-fold. 1) A simple code base can be configured into one or more applications, thus providing better long term code maintenance and reducing lifecycle costs. 2) Immediately, or otherwise efficient, access can be provided to a new application and new data simply by pointing the simple code base (i.e., container application) to a corresponding new trusted source to which the user has approved access, thus reducing overall deployment time for new applications and saving the system's administration and support time. 3) Immediate, or otherwise efficient, access can be provided to content that is optimized for different modes of use without having to download different applications or content, thus allowing a mixture of training, job aides and emergency check sheets to co-exist in a manner not typically available today from conventional, precompiled applications.

D. COMMUNICATIONS AND DATA ARCHITECTURE

The elegance inherent in various embodiments of the present invention is the dynamic nature of some or all aspects of the architecture, from the definition of the device type to the interaction mode, and from the population of content to the contingency plans for connected and disconnected modes.

FIG. 4 is a diagram of an exemplary architecture of the present invention behaving differently in differing situations. A beneficial feature of some exemplary embodiments of the present invention is how the architecture can use and access data. For example, as shown with respect to the top-most pictured Android device of FIG. 4, an exemplary application of the present invention can be resident on the device and can access a URL when in connected mode over high-speed Wi-Fi, but the application can also be a standalone application when unconnected or connected over an insufficient network. A second Android device, pictured in the middle, can use a local cache in conjunction with the application to store content at lower speeds or in situations where users are prone to periodic disconnects. A third device, for example, pictured on the bottom, illustrates how the application, cache, and data store can work together for applications that are disconnected and expected to operate primarily in a disconnected mode.

By providing a solution in a single application that can be configured and reconfigured on the fly for various connection modes, and further configured by usage conditional logic, an exemplary embodiment of the invention can meet a wide array of mission critical needs with a single code base. Resultantly, embodiments of the present invention can provide a multi-layer security structure of accessing a URL through a buffer, and then allowing access to trusted sources in the "configure" step, thus providing security at the applications, network, server and data levels.

Various embodiments of the present invention can provide many advantages over the current way that applications are built for mobile devices. The ability to minimize the platform specific code base required for an application to run on each device can allow for a new version of the application to be developed quickly when support for a new mobiles OS is desired. Prior code developed for this architecture can be deployed to a new device platform as soon as a new application container is built to support the platform and configure itself. The reuse of the "content" of an application can allow for use of content across a much broader range of devices, more quickly for longer periods of time in a native device environment, as opposed to being in a web browser. The nature of this solution can also lend itself well to changing configurations quickly in order to leverage existing content on existing devices more quickly without having to recode and redeploy new applications. A further benefit is that by tracking usage for media items, content can be updated as technology and preferences change, thus improving solutions relevant to various fields, including decision support systems, medical diagnostics systems, financial analysis systems, sales and marketing solutions, education, and training.

Figure 5:
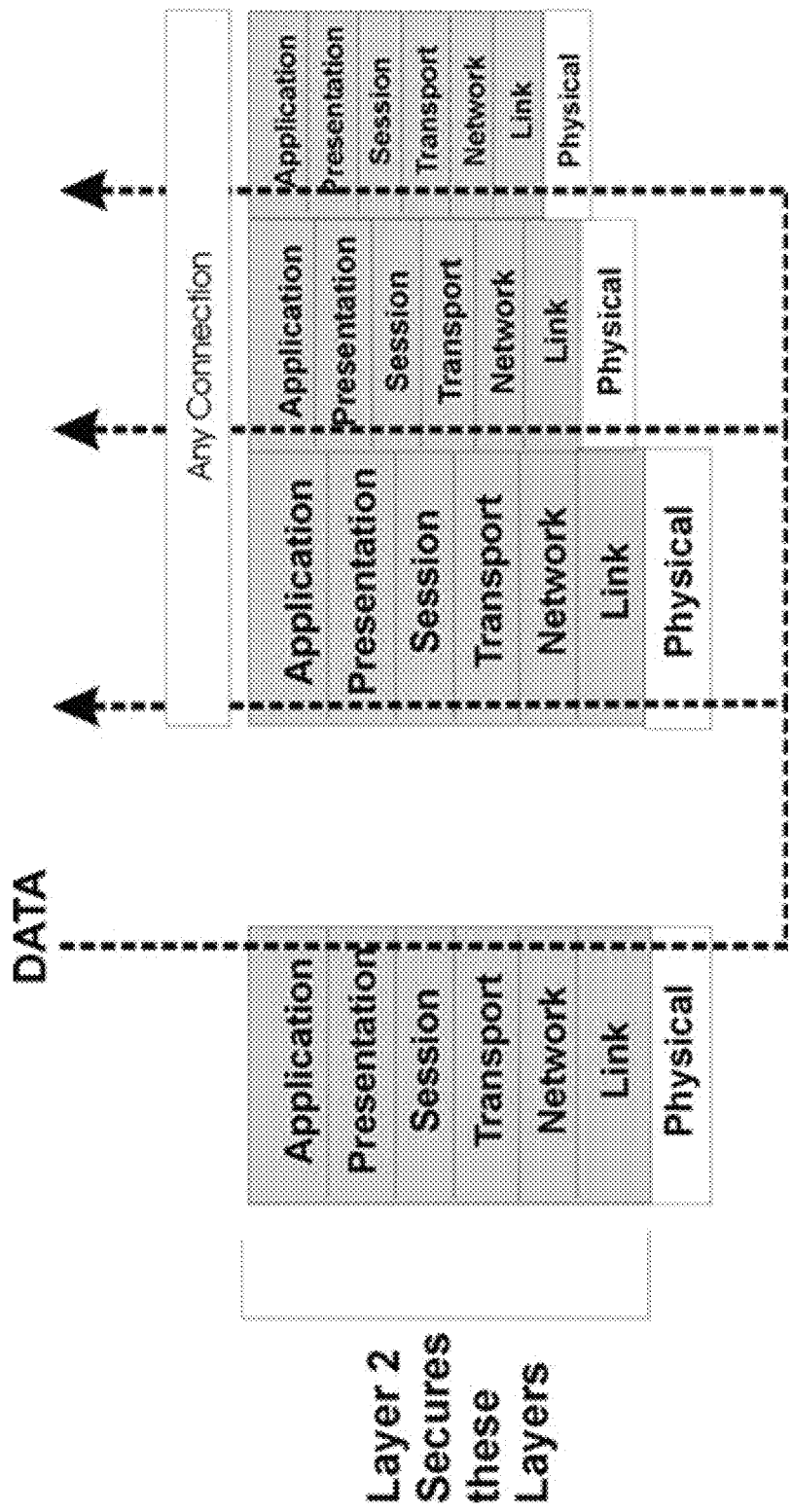
FIG. 5 illustrates a security layer of the application system, according to an exemplary embodiment of the present invention.

FIG. 5 illustrates a security layer of the application system, according to an exemplary embodiment of the present invention. The security of the application system can be modular and can support any of one or more industry-standard or novel security protocols, such as one or more standard security types illustrated in FIG. 5, which depicts various common security types. An exemplary embodiment of the application system can utilize a different security protocol for access to each of the container, the configuration, and the content. As a result, more stringent security can be provided as compared to conventional systems for providing dynamic application content.

At the container level, there may be no security, in some embodiments, and the platform-specific container application may be downloadable without authentication being required. Any device with the container application may be at any trusted source acting as a configuration server to potentially receive new functionality. One or more specific configurations, however, may require specialized access or permissions. For example, and not limitation, for a military use session, a device with the container application may be pointed at a secure configuration or content server to allow specialized use in military or combat situations. In the event that the device is seized, the end of the session may halt access to the session's configuration, so the configuration and content may be inaccessible to enemy forces.

Enhanced security comes from the fact that, in order to make use of a particular content, a user may have to bypass up to three layers of security (i.e., one for each of the container, the configuration, and the content) rather than just a single layer, which is typical of other dynamic content solutions. For example, in a conventional web browser, after access to a web server is achieved, a user has access to all the pages and all the content associated with the web server and can immediately view that content. In contrast, various embodiments of the present invention can prevent a user from even determining the type of application for which the container application was last used or can be used if the first level of security is breached. If the second level is breached, then only the configuration of the container application can be determined, but content still remains inaccessible. In an exemplary embodiment of the application system, all three levels of security must be bypassed to access the most secure contents.

Figure 6:
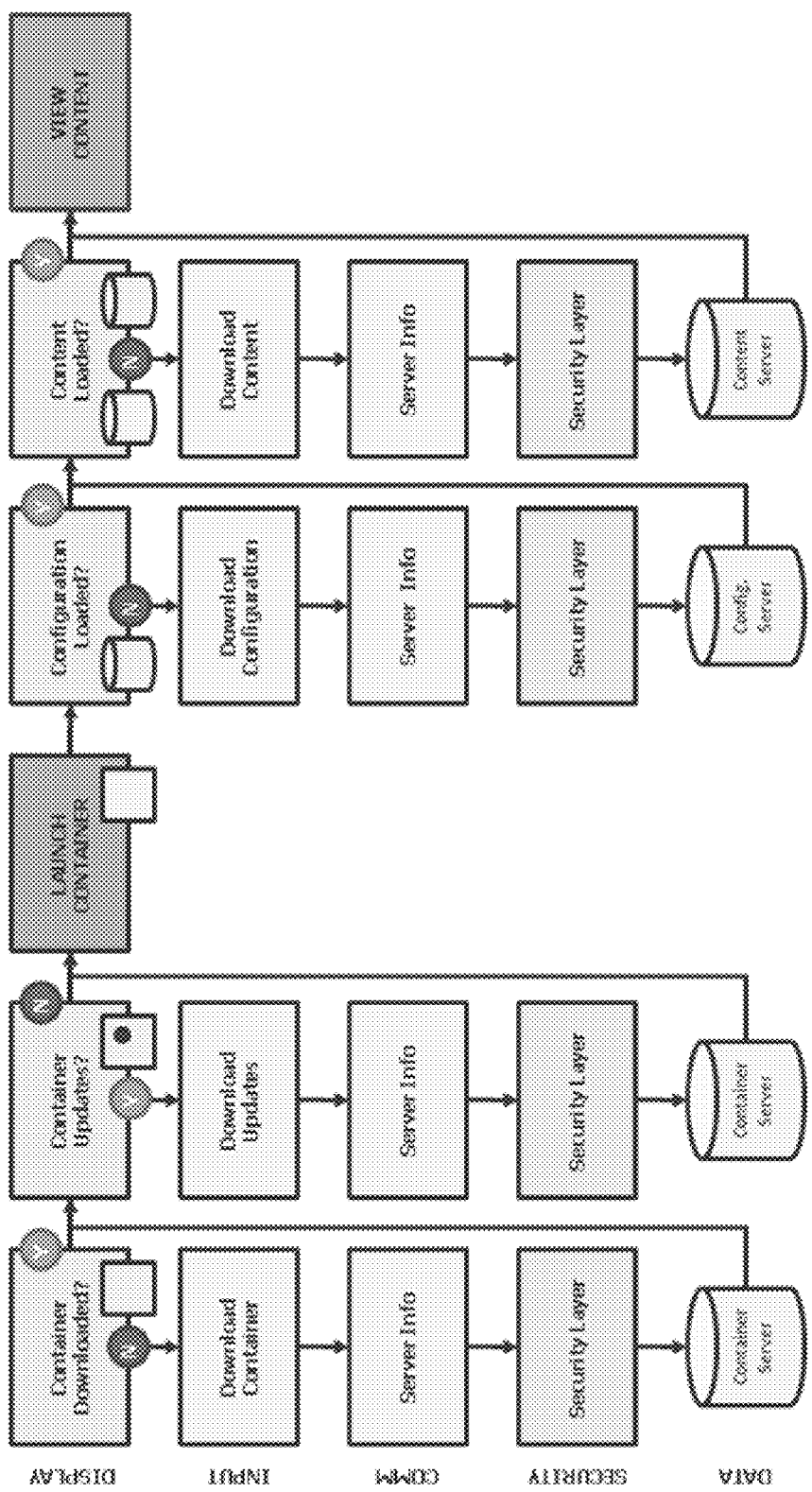
FIG. 6 illustrates a flow diagram of a method of the application system, according to an exemplary embodiment of the present invention.

FIG. 6 illustrates a flow diagram of a method of the application system, according to an exemplary embodiment of the present invention. Following is a description of a use case of an exemplary embodiment of the application system, as illustrated in FIG. 6:

1. Select device of your choice, including, for example, an iPhone, Android, or Blackberry device.
2. Is the Container loaded?
   A. If YES, then continue to Step 3.
   B. If NO, then download device specific container application from the application server.
      i. Browse server list to select server; or
      ii. Load server info from saved profile; or
      iii. Input alternate server location.
         a. Server specific security layer protects access to Container application.
         b. Download Container application.
3. If the Container application is loaded, is there any indication of an update?
   A. If NO, then continue to Step 4.
   B. If YES, then connect to a container application server to get device specific updates.
      i. Browse server list to select server; or
      ii. Load server info from saved profile; or
      iii. Input alternate server location.
         a. Server specific security layer protects access to Container updates.
         b. Download Container applications updates.
4. Launch Container application.
5. Is the Configuration loaded?
   A. If YES, then continue to Step 6.
   B. If NO, then download a device-independent function-specific configuration profile from the configuration server.
      i. Browse server list to select server; or
      ii. Load server info from saved profile; or
      iii. Input alternate server location.
         a. Server specific security layer protects access to Configuration profile.
         b. Download Configuration profile.
6. Is the Content loaded?
   A. If YES, then continue to Step 7.
   B. If NO, then download configuration-independent subject-specific content material from the content server.
      i. Browse server list to select server; or
      ii. Load server info from saved profile; or
      iii. Input alternate server location.
         a. Server specific security layer protects access to Content material.
         b. Download Content material, including but not limited to text, graphics, animation, audio, video and simulations.
7. Use the application on the device
   A. To change the type of application that the container represents, change the configuration as in Step 5 and download new content associated with that configuration as in Step 6.

Figure 7A:
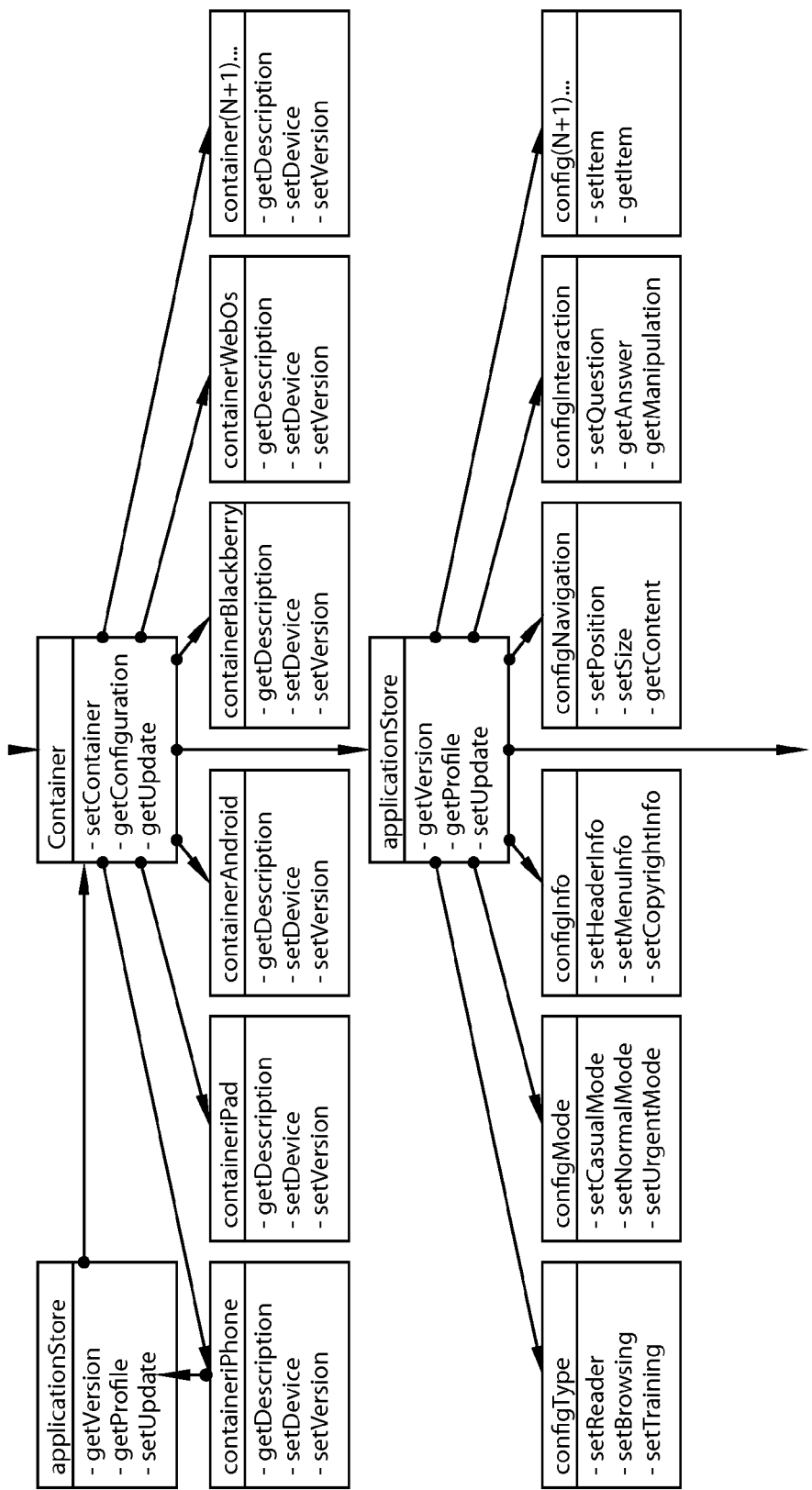
FIGS. 7A-7B illustrate an exemplary UML class diagram for the application system, according to an exemplary embodiment of the present invention.
Figure 7B:
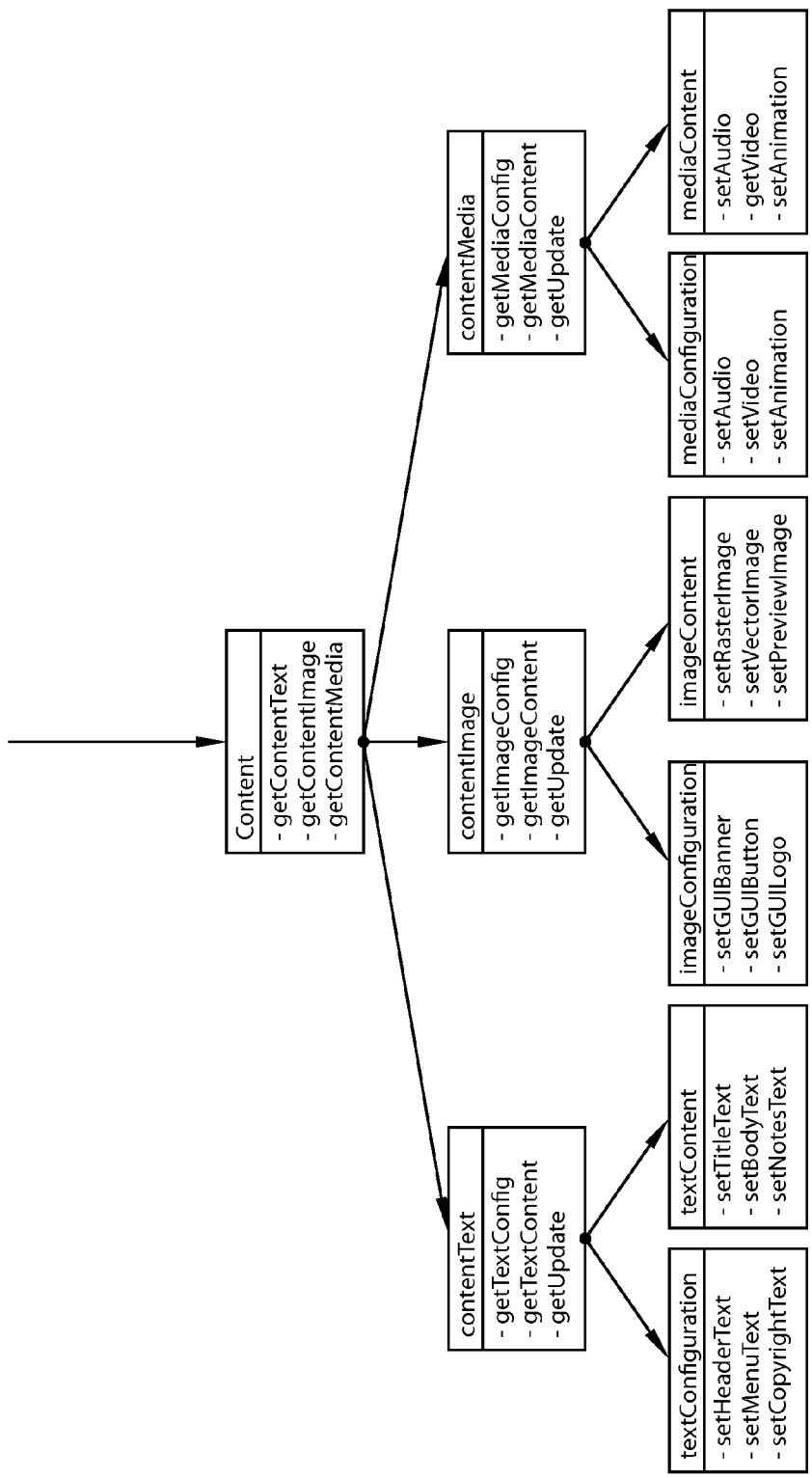

FIGS. 7A-7B illustrate an exemplary UML class diagram for the application system, according to an exemplary embodiment of the present invention. These two figures illustrate a single diagram spanning two pages, where the arrow at the bottom of FIG. 7A flows into the top of FIG. 7B. The class diagram can be used by a software engineer to create an exemplary embodiment of the application system. It will be understood that the class diagram is provided herein for illustrative purposes only and does not limit the various embodiments of the present invention.

E. WORKING PROTOTYPE

Figure 8C:
FIGS. 8A-8F are screenshots of an application based on a working prototype of an exemplary embodiment of the present invention.
Figure 8B:
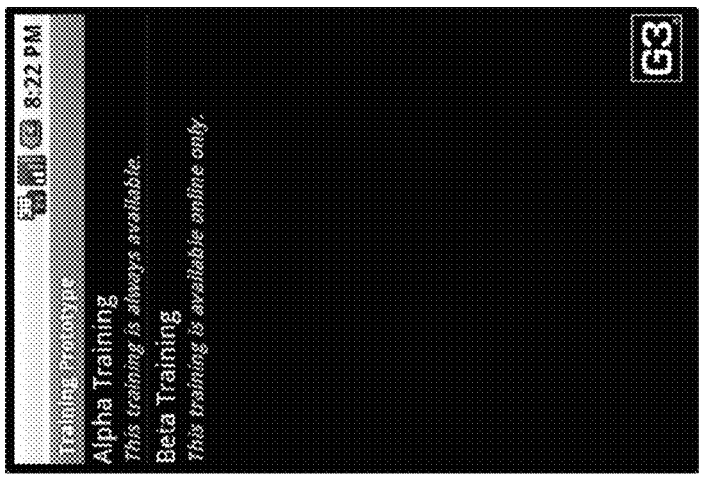
Figure 8A:
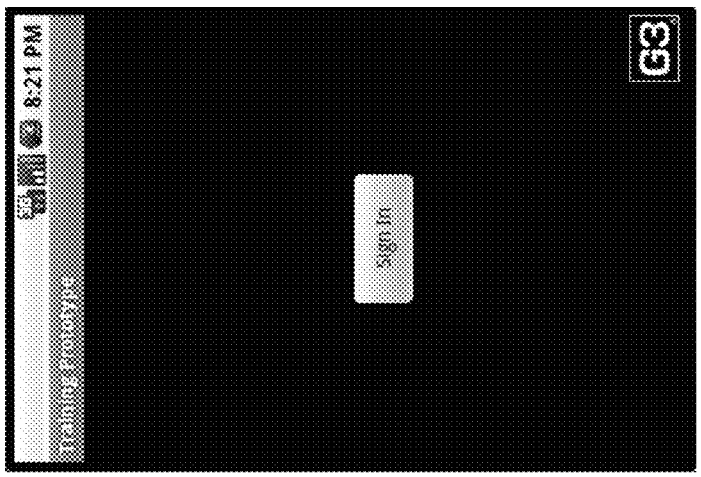
Figure 8D:
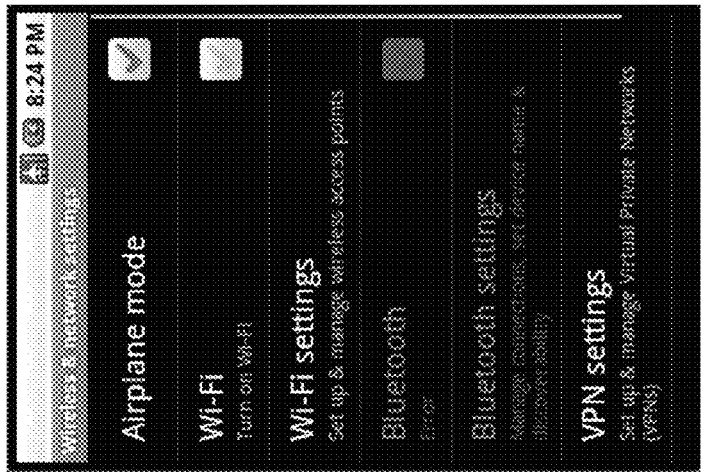
Figure 8E:
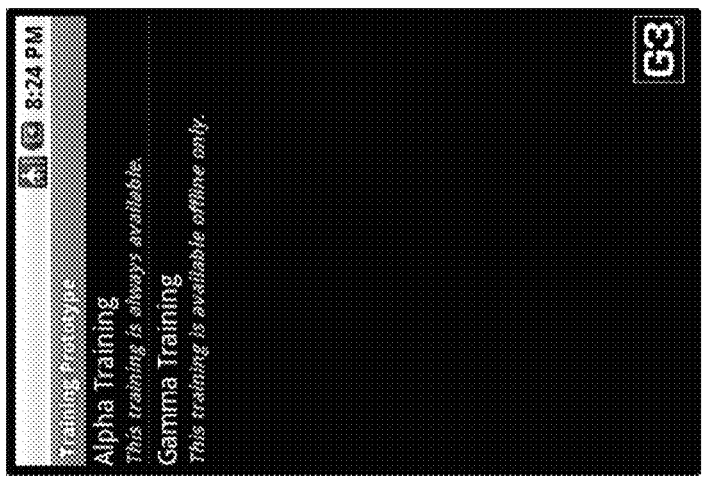
Figure 8F:
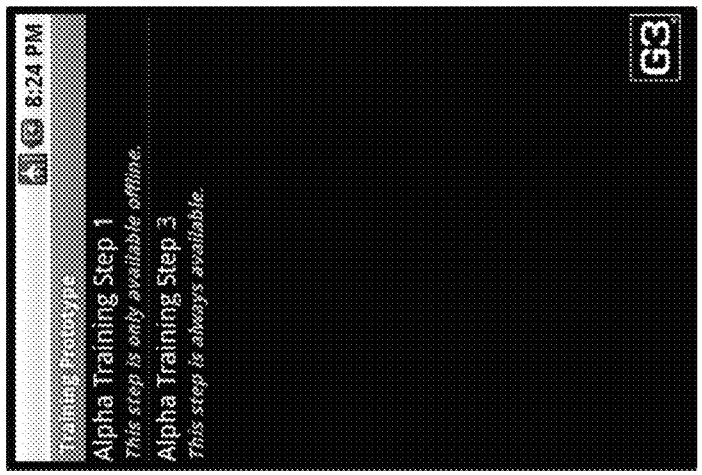

A working prototype of an exemplary embodiment of the present invention has been developed, and screenshots of that prototype of provided in FIGS. 8A-8F. The screenshots illustrate how an application of the present invention can behave differently in connected and disconnected modes. More specifically, FIG. 8A illustrates signing in to a trusted source; FIG. 8B illustrates a list of available training when connected to a network, FIG. 8C illustrates selecting settings; FIG. 8D illustrates turning all radios off; FIG. 8E illustrates a list of available training when not connected to the network; and FIG. 8F illustrates the steps of one of the trainings, Alpha Training, demonstrating that one of the steps is unavailable off of the network.

F. EMBODIMENT IN A COMPUTING DEVICE

Figure 9:
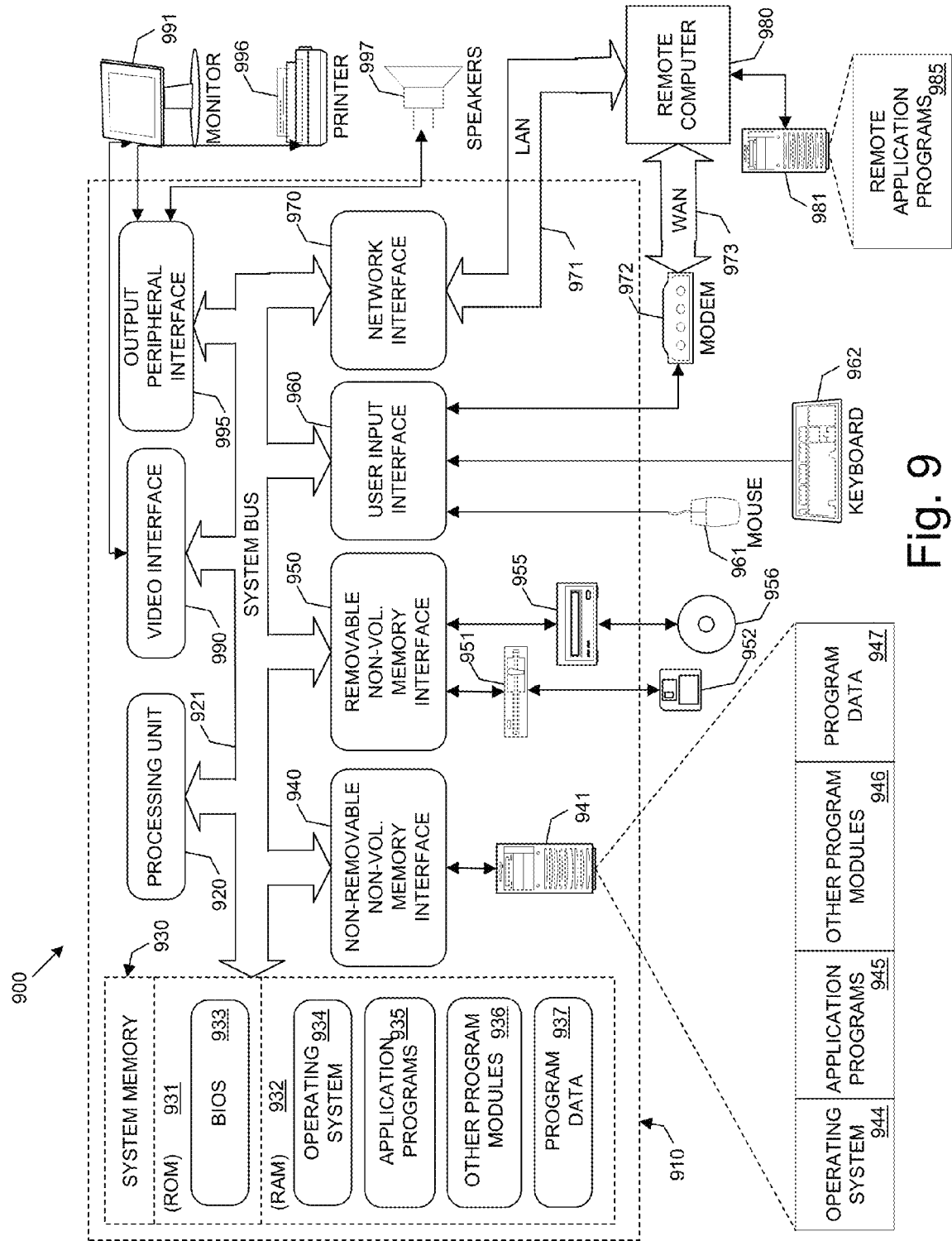
FIG. 9 illustrates a computer architecture for the application system, according to an exemplary embodiment of the present invention.

One or more aspects of the application system 100 and related methods can be embodied, in whole or in part, in a computing device 900, such as a mobile telephone or other mobile computing device. FIG. 9 illustrates an example of a suitable computing device 900 that can be used as or can comprise a portion of the application system 100, according to an exemplary embodiment of the present invention.

Although specific components of a computing device 900 are illustrated in FIG. 9, the depiction of these components in lieu of others does not limit the scope of the invention. Rather, various types of computing devices 900 can be used to implement embodiments of the application system 100. Exemplary embodiments of the application system 100 can be operational with numerous other general purpose or special purpose computing system environments or configurations. Examples of well-known computing systems, environments, and/or configurations that can be suitable for use with the invention include, but are not limited to, mobile telephones, tablet computers, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary embodiments of the application system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types. For example, and not limitation, an exemplary embodiment of the application system can comprise one or more units, which can be programs, program modules, or other operative components of the application system 100. The units of the application system 100 can comprise a container unit, a configuration unit, a content unit, and a session unit. The container unit can provide the thin container application on the computing device 900; the configuration unit can communicate with a trusted source to configure the container application to be a specific type of application, during a current session of use; the content unit can provide content to the container application, thereby converting the container application into the specific application useable by a user for a specific purpose; and the session unit can remove some or all configuration and content data at the end of the session, thus enabling reuse of the container application for a different purpose. The above units are distinguished herein based on operative distinctiveness, but they can be implemented in various fashions, and thus need not be separated in an exemplary implementation. The elements or components making up the various units can overlap or be divided in a manner other than that described herein.

With reference to FIG. 9, components of the computing device 900 can comprise, without limitation, a processing unit 920 and a system memory 930. A system bus 921 can couple various system components including the system memory 930 to the processing unit 920. The system bus 921 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 900 can include a variety of computer readable media. Computer-readable media can be any available media that can be accessed by the computing device 900, including both volatile and nonvolatile, removable and non-removable media. For example, and not limitation, computer-readable media can comprise computer storage media and communication media. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 900. For example, and not limitation, communication media can include wired media such as a wired network or direct-wired connection, and wireless media such as acoustic, RF, infrared and other wireless media. Combinations of any of the above can also be included within the scope of computer readable media.

The system memory 930 can comprise computer storage media in the form of volatile or nonvolatile memory such as read only memory (ROM) 931 and random access memory (RAM) 932. A basic input/output system 933 (BIOS), containing the basic routines that help to transfer information between elements within the computing device 900, such as during start-up, can typically be stored in the ROM 931. The RAM 932 typically contains data and/or program modules that are immediately accessible to and/or presently in operation by the processing unit 920. For example, and not limitation, FIG. 9 illustrates operating system 934, application programs 935, other program modules 936, and program data 937.

The computing device 900 can also include other removable or non-removable, volatile or nonvolatile computer storage media. By way of example only, FIG. 9 illustrates a hard disk drive 941 that can read from or write to non-removable, nonvolatile magnetic media, a magnetic disk drive 951 for reading or writing to a nonvolatile magnetic disk 952, and an optical disk drive 955 for reading or writing to a nonvolatile optical disk 956, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 941 can be connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9 can provide storage of computer readable instructions, data structures, program modules and other data for the computing device 900. For example, hard disk drive 941 is illustrated as storing an operating system 944, application programs 945, other program modules 946, and program data 947. These components can either be the same as or different from operating system 934, application programs 935, other program modules 936, and program data 937.

A web browser application program 935, or web client, can be stored on the hard disk drive 941 or other storage media. The web client 935 can request and render web pages, such as those written in Hypertext Markup Language ("HTML"), in another markup language, or in a scripting language. The web client 935 can be capable of executing client-side objects, as well as scripts within the browser environment. Additionally, the web client 935 can execute web application programs, which can be embodied in web pages.

A user of the computing device 900 can enter commands and information into the computing device 900 through input devices such as a keyboard 962 and pointing device 961, commonly referred to as a mouse, trackball, or touch pad. Other input devices (not shown) can include a microphone, joystick, game pad, satellite dish, scanner, electronic white board, or the like. These and other input devices are often connected to the processing unit 920 through a user input interface 960 coupled to the system bus 921, but can be connected by other interface and bus structures, such as a parallel port, game port, or a universal serial bus (USB). A monitor 991 or other type of display device can also be connected to the system bus 921 via an interface, such as a video interface 990. In addition to the monitor, the computing device 900 can also include other peripheral output devices such as speakers 997 and a printer 996. These can be connected through an output peripheral interface 995.

The computing device 900 can operate in a networked environment, being in communication with one or more remote computers 980 over a network. The remote computer 980 can be a personal computer, a server, a router, a network PC, a peer device, or other common network node, and can include many or all of the elements described above relative to the computing device 900, including a memory storage device 981.

When used in a LAN networking environment, the computing device 900 can be connected to the LAN 971 through a network interface or adapter 970. When used in a WAN networking environment, the computing device 900 can include a modem 972 or other means for establishing communications over the WAN 973, such as the internet. The modem 972, which can be internal or external, can be connected to the system bus 921 via the user input interface 960 or other appropriate mechanism. In a networked environment, program modules depicted relative to the computing device 900 can be stored in the remote memory storage device. For example, and not limitation, FIG. 9 illustrates remote application programs 985 as residing on memory storage device 981. It will be appreciated that the network connections shown are exemplary and other means of establishing a communications link between the computers can be used.

G. CONCLUSION

While various embodiments of the present invention have been disclosed in exemplary forms, many modifications, additions, and deletions can be made without departing from the spirit and scope of the invention and its equivalents, as set forth in the following claims.

What is claimed is:

1. A system comprising:
   a computer processing unit comprising at least one processor;
   a container application customized for a computing platform, wherein the container application is adaptable to become a plurality of consumer applications;
   a configuration unit for communicating with a first remote trusted source during a first session, and for receiving, from the first remote trusted source, configuration data for configuring the container application, the configuration data being adapted to indicate a first consumer application for the container application;
   a content unit, for receiving content data from a second remote trusted source, and for providing the content data to the container application, based at least partially on the configuration data, wherein the content data comprises a first subset of content data and a second subset of content data, and the content unit is configured to provide the first subset of content data responsive to determining that a computing device hosting the container application is connected to a network and to provide the second subset of content data responsive to determining that the computing device is disconnected from the network; and
   a session unit for removing, by the computer processing unit, based on predetermined security settings, at least a portion of the configuration data and the content data responsive to the first session ending.

2. The system of claim 1, the configuration data comprising data for a framework of a graphical user interface for the first consumer application.

3. The system of claim 2, the content data comprising one or more graphical objects for the graphical user interface.

4. The system of claim 3, the content data being at least partially dependent on the configuration data and one or more properties of a mobile device executing the container application.

5. The system of claim 1, the configuration unit utilizing a first layer of security, and the content unit utilizing a second layer of security.

6. The system of claim 1, the first remote trusted source and the second remote trusted source being different remote trusted sources.

7. The system of claim 1, wherein the second remote trusted source selects data to transmit to the content unit based on the configuration data.

8. The system of claim 1, the container application comprising a local data location fillable by the configuration data and the content data.

9. The system of claim 1, the container application becoming a second consumer application in a second session.

10. The system of claim 1, the first consumer application rendered inaccessible responsive to the session unit removing at least the portion of the configuration data and the content data.

11. The system of claim 1, wherein the container application is automatically configured by the computer processing unit responsive to receiving configuration data from the first remote trusted source.

12. The system of claim 1, wherein the content data received by the content unit from the second remote trusted source is based on a network connection status associated with a computing device hosting the container application.

13. The system of claim 1, wherein the content data received by the content unit from the second remote trusted source is based on a network connection speed associated with a computing device hosting the container application.

14. The system of claim 1, wherein the content data provided by the content unit is based on a network connection status associated with a computing device hosting the container application.

15. The system of claim 1, further comprising a local data store associated with the container application, at least a portion of the configuration data and the content data stored in the local data store.

16. The system of claim 15, the session unit configured to remove at least a portion of the content data from the local data store associated with the container application responsive to determining a computing device hosting the container application has disconnected from a network.

17. The system of claim 15, the system configured to remove at least a portion of the configuration data from the local data store associated with the container application responsive to determining a session with the container application has ended.

18. The system of claim 1, the container application received by a computing device from a third trusted remote source, the third trusted remote source utilizing a third level of security.

\* \* \* \* \*